United States Patent [19]

Davies et al.

[11] Patent Number: 5,545,422

[45] Date of Patent: Aug. 13, 1996

[54] PEELING APPARATUS AND METHOD

[75] Inventors: Peter O. Davies; Nicholas C. Dromgool; Graeme L. Collinson; Alan P. Fish, all of Auckland, New Zealand

[73] Assignee: International Fruit Peelers Limited, New Zealand

[21] Appl. No.: 436,218

[22] PCT Filed: Nov. 15, 1993

[86] PCT No.: PCT/NZ93/00113

§ 371 Date: May 15, 1995

§ 102(e) Date: May 15, 1995

[87] PCT Pub. No.: WO94/10863

PCT Pub. Date: May 26, 1994

[30] Foreign Application Priority Data

Nov. 16, 1992 [NZ] New Zealand ............................ 245144
Jun. 3, 1993 [NZ] New Zealand ............................ 247777

[51] Int. Cl.$^6$ .................. A23L 1/00; A23N 7/00
[52] U.S. Cl. .................. 426/482; 99/472; 99/584
[58] Field of Search .................. 426/482, 481, 426/518, 615; 99/472, 584, 483

[56] References Cited

U.S. PATENT DOCUMENTS

| | | | |
|---|---|---|---|
| 2,523,635 | 9/1950 | Ramstad et al. | 426/482 |
| 3,528,470 | 9/1970 | De Back | 426/482 |
| 3,759,166 | 9/1973 | Trandin et al. | 99/472 |
| 3,982,037 | 9/1976 | Weaver et al. | 426/482 |
| 4,026,203 | 5/1977 | Levati | 99/472 |
| 4,092,910 | 6/1978 | Genchev et al. | 99/472 |
| 4,284,651 | 8/1981 | Bruemmer | 426/482 |
| 4,315,039 | 2/1982 | Levati | 426/482 |
| 4,450,762 | 5/1984 | Lustig | 426/482 |
| 4,765,233 | 8/1988 | Genchev et al. | 99/472 |

FOREIGN PATENT DOCUMENTS

| | | |
|---|---|---|
| 0283607 | 9/1988 | European Pat. Off. . |
| 3305449 | 8/1984 | Germany . |
| 46-42933 | 12/1971 | Japan ............................ 426/482 |
| 58184248 | 8/1985 | Japan . |
| 2-132680 | 5/1992 | Japan . |
| 194578 | of 0000 | New Zealand . |
| 172833 | of 0000 | New Zealand . |
| 234973 | of 0000 | New Zealand . |
| 184392 | of 0000 | New Zealand . |
| 149570 | 11/1968 | New Zealand . |
| 152431 | 1/1970 | New Zealand . |
| 154860 | 3/1970 | New Zealand . |
| 181709 | 7/1978 | New Zealand . |
| 219769 | 7/1988 | New Zealand . |
| 231267 | 6/1992 | New Zealand . |
| 1337402 | 11/1973 | United Kingdom . |

*Primary Examiner*—George Yeung
*Attorney, Agent, or Firm*—Rothwell, Figg, Ernst & Kurz

[57] ABSTRACT

A fruit or vegetable peeling apparatus (1) moves the fruit or vegetable from a loading station, which includes a centralising means (14) to a heating station (23), a ripping or scragging station (24), a vacuum peeling station (25) and finally a cutting station (26). The heating at (23) which can be by infra-red radiation, is sufficient to at least partially lift the skin from the flesh. One or more scragging wheels (32) can then puncture and lift the skin to provide access for vacuum at (25) to peel the skin off. A further embodiment uses gas flame heating and a linear conveying system.

12 Claims, 12 Drawing Sheets

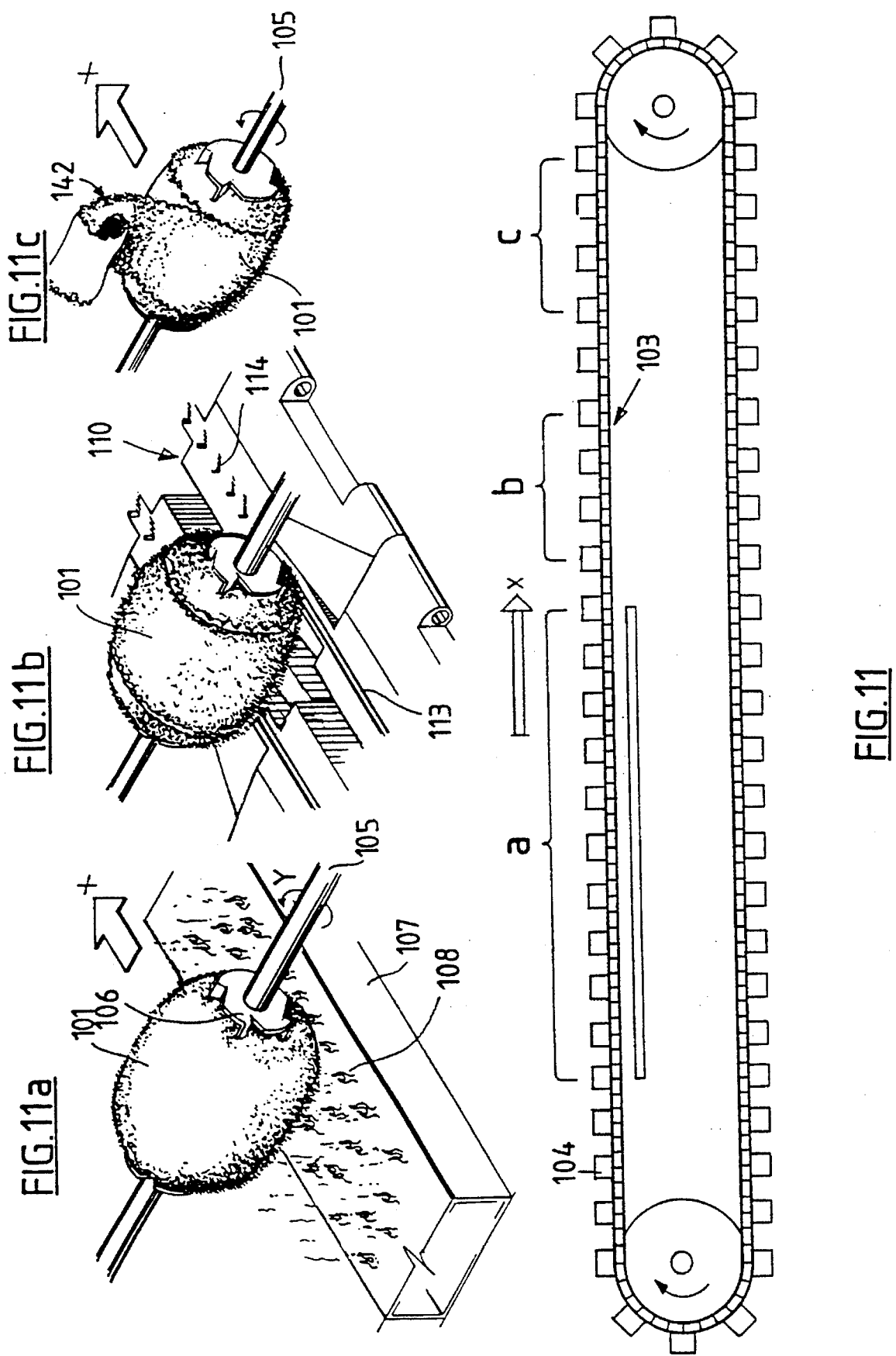

PEELING APPARATUS AND METHOD

BACKGROUND OF THE INVENTION

The present invention relates to peeling apparatus and methods and more particularly but not exclusively to the peeling and processing of fruit such as kiwifruit and tamarillos and vegetables with skins, tomatoes in particular.

There are many instances where a fruit or vegetable needs to have its skin removed so that it can be used immediately in that form or can then be further processed. The ability to provide a readily peeled fruit or vegetable can contribute to new markets for that product particularly where there is any lessening of demand for the whole fruit or vegetable or where there may be an over abundance of them. Also, in the case of kiwifruit where strict quality regulations apply, at least in New Zealand, a large number of reject fruit may be of perfectly good quality apart from being of a substandard size or having some unacceptable blemish for example.

Also in the particular case of kiwifruit there is an increasing demand for the supply of the peeled fruit which can then be sliced and used in catering.

Various proposals have been put forward in the past whereby fruit and vegetables can be peeled. Such prior proposals have included freezing and scorching techniques to facilitate the removal of the skin.

All such previous proposals have however been inefficient and/or ineffective or suffered from some drawback such as requiring highly complex machinery.

It is thus an object of the present invention in its various embodiments to provide a method and/or apparatus for peeling a fruit or vegetable which overcomes or at least obviates disadvantages in prior methods or apparatus for this purpose or which at least will provide the public with a useful choice.

Further objects of this invention will become apparent from the following description.

BRIEF SUMMARY OF THE INVENTION

According to one aspect of the present invention there is provided a method of peeling a fruit or vegetable comprising the steps of:

(i) heating the fruit or vegetable to at least partially separate the skin from the flesh;

(ii) ripping the skin about at least one peripheral portion thereof so that at least a partial lifting of the skin at or about the rip occurs;

(iii) providing a vacuum to act on said skin at or about said rip to lift said skin from said flesh.

According to a further aspect of the present invention there is provided an apparatus for peeling fruit or vegetable comprising:

(i) a heating means to heat a fruit or vegetable sufficient to at least partially separate the skin from the flesh;

(ii) a ripping means to rip said skin at least about one peripheral portion of the skin so that the skin is at least partially lifted from the fruit or vegetable;

(iii) a vacuum means to act on said fruit or vegetable at or about said rip so as to lift said skin from said fruit or vegetable.

According to a still further aspect of the present invention there is provided a fruit or vegetable peeled by a method and/or apparatus as defined in the immediately preceding paragraphs.

Further aspects of this invention which should be considered in all its novel aspects will become apparent from the following description given by way of example of possible embodiments thereof and in which reference is made to the accompanying drawings.

BRIEF DESCRIPTION OF THE DRAWINGS

FIGS. 11, 11a, 11b, & 11c: show very diagrammatically the heating, ripping and peeling stations of an apparatus according to the further embodiment to the invention;

FIGS. 13 and 13a: show very diagrammatically the operation of a multiple vacuum peeling unit for use in a possible embodiment of the invention.

BRIEF DESCRIPTION OF PREFERRED EMBODIMENTS

In a peeling apparatus and method according to the present invention the fruit or vegetable (fruit will be referred to exclusively hereinafter for simplicity only) is first loaded onto a suitable transporting means which will take the fruit to a heating station. Here sufficient heat is applied to separate internally and at least partially, the peel and flesh. Following the heating station the fruit will pass to a ripping station where a rip or tear is provided and in the case of an elongate fruit such as a kiwifruit typically about both peripheral ends of the fruit. The fruit will then travel to a vacuum station where a vacuum will be applied to lift off the peel from the fruit. The peeled fruit can then be topped and tailed at a cutting station and the peeled and cut fruit is then ready to be further processed as required.

Figure 1:
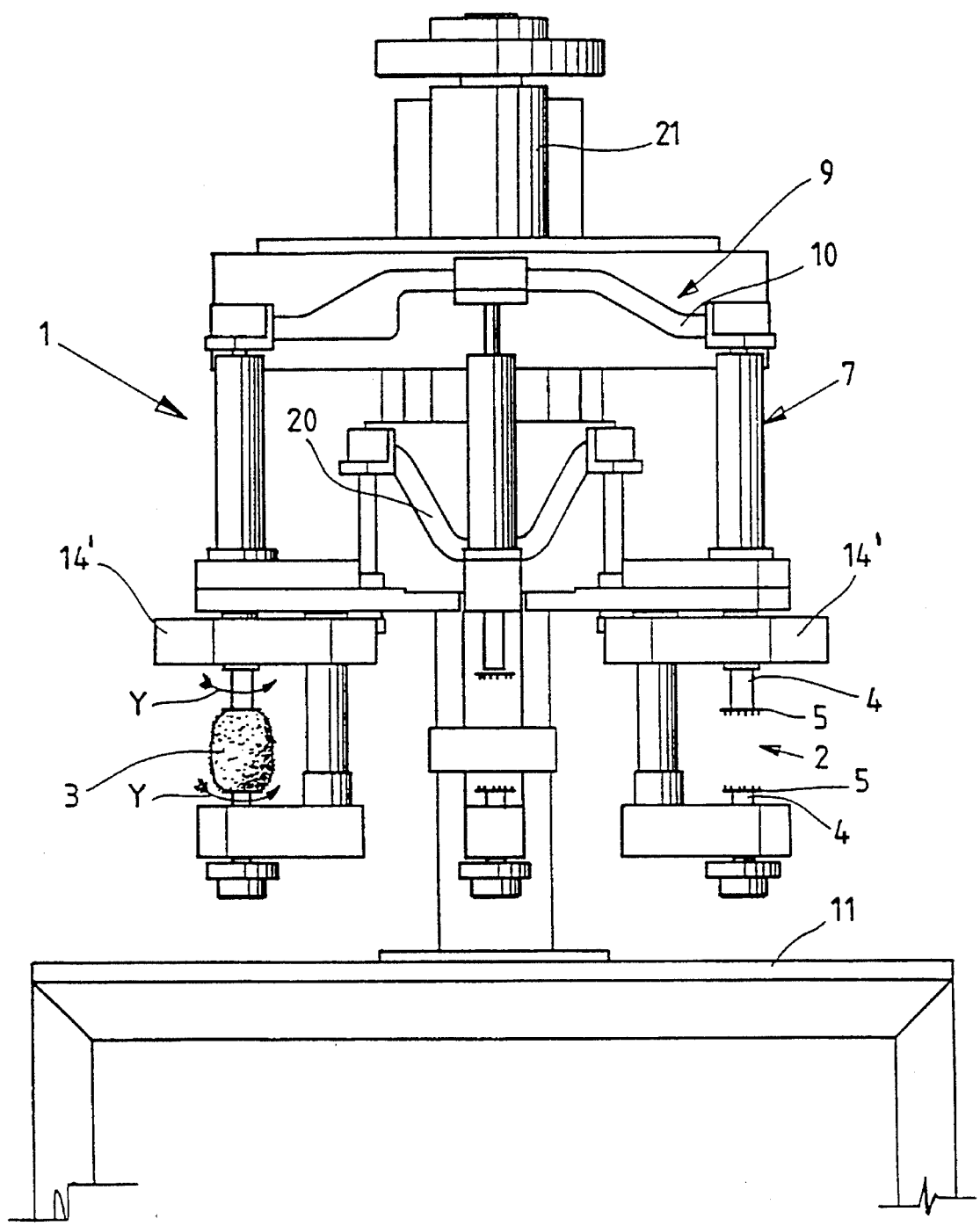
FIG. 1: shows very diagrammatically a side elevational view of a peeling apparatus according to one possible embodiment of the invention.
Figure 2:
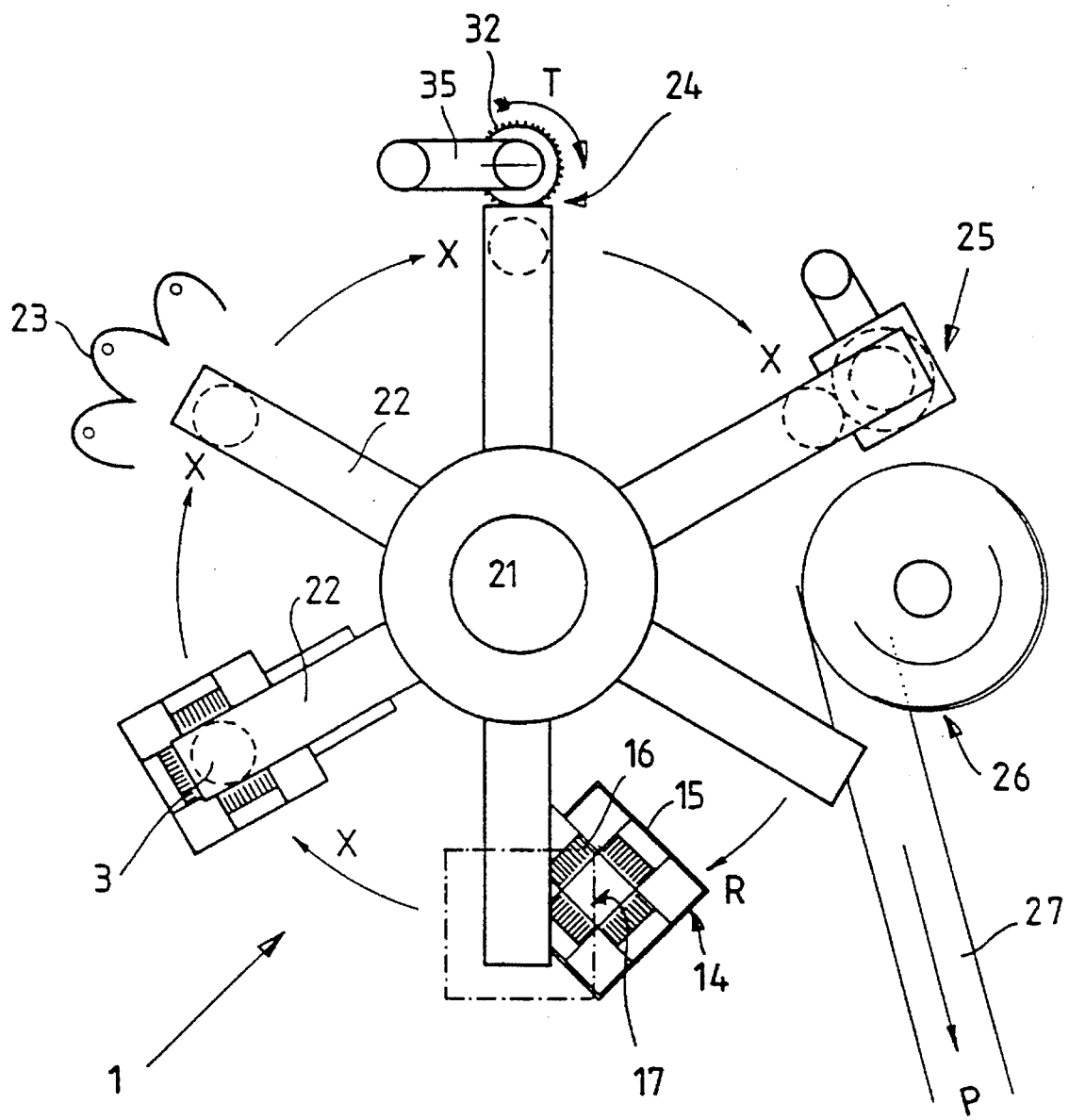
FIG. 2: shows very diagrammatically a plan view of the apparatus of FIG. 1.
Figure 9:
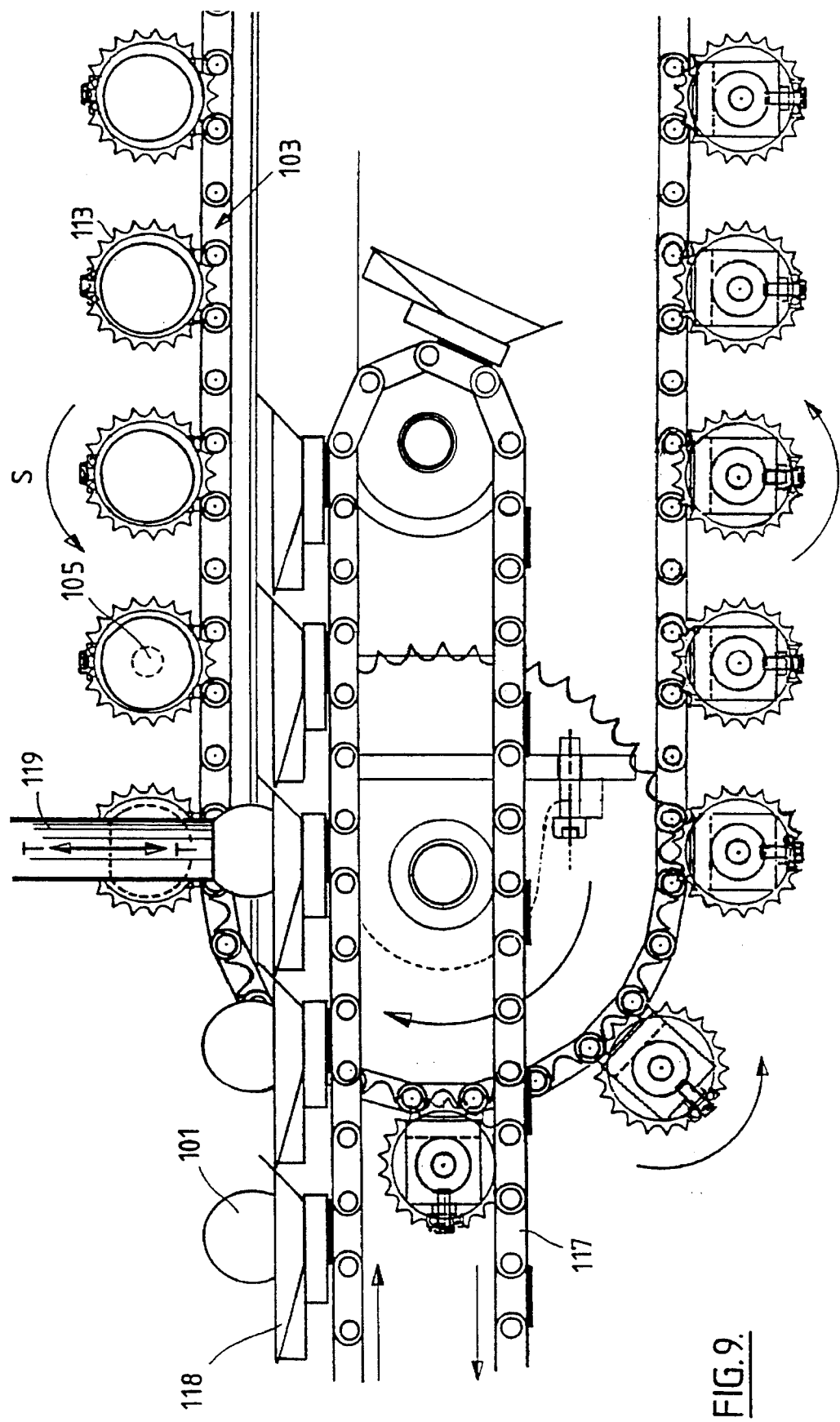
FIGS. 9 and 10: show side and end views of a loading station of a peeling apparatus according to a further embodiment of the invention.

Referring firstly to FIGS. 1 and 2, one possible embodiment to the present invention is shown very diagrammatically and is referenced generally by arrow 1. In this particular embodiment of the invention the apparatus operates in a rotary mode and in this particular embodiment rotates about a vertical axis. In an alternative embodiment of the invention the apparatus 1 could operate so as to rotate about a horizontal axis or could operate in a linear mode, the latter being described in respect of the embodiment of FIG. 9 onwards.

The apparatus 1 is shown having a plurality of carrier members 2 each of which can carry an individual fruit or vegetable 3. A kiwifruit is shown in FIG. 1 by way of example only. Each carrier member 2 comprises a pair of opposed shafts 4 which are rotatable as indicated by the arrows Y, and have toothed plates 5 which can dig into the flesh of the fruit 3 to hold it firmly between its ends.

Figures 3A, 3B:
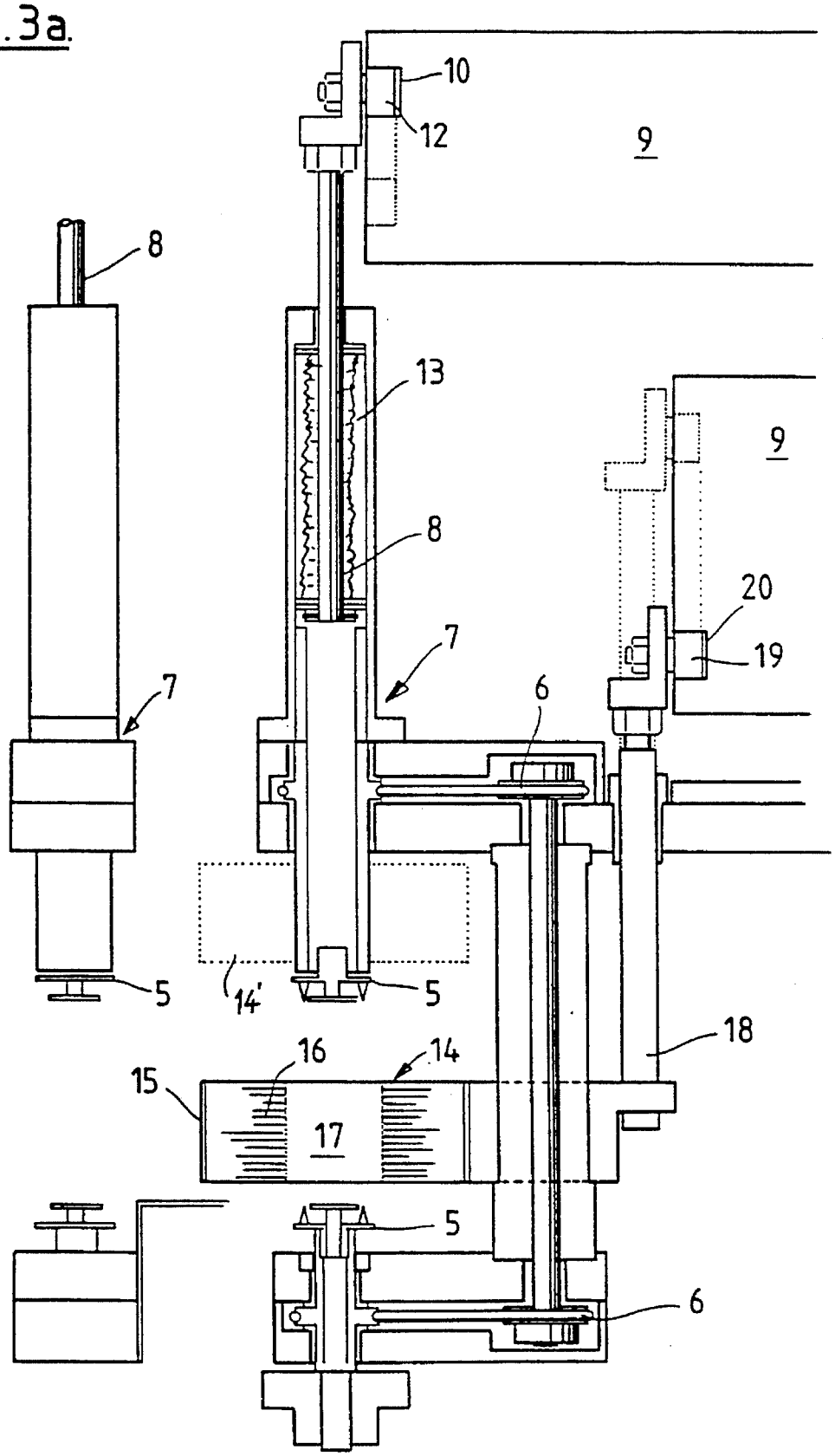
FIGS. 3a and 3b: show end and side cross sectional views of a loading station of the apparatus of FIGS. 1 and 2.

One or both of the shafts 4 may be driven so as to rotate the fruit 3. The drive may be of any suitable type such as electric or hydraulic and may comprise a direct drive to both of the shafts 4 or may, as indicated in FIG. 3b, comprise a drive to one of the shafts 4 which is then coupled by means of a belt and pulley arrangement 6 to the other shaft 4. The top toothed plate 5 in this embodiment is able to move vertically so as to be able to engage with a fruit 3 when introduced into the apparatus 1. For this purpose, as shown particularly in FIGS. 3a and 3b the top plate 5 is provided at the lower end of a cylinder arrangement 7 connected via a rod assembly 8 and spring 13 with a main support structure 9. The main support structure 9 is shown provided with a cam track 10 the vertical height of which varies relative to the structure base 11 and as shown in outline in FIG. 3b for example. The rod assembly 8 includes a cam follower 12 at its upper end which as it follows the cam profile 10 will control the bias on a spring 13 and thus control the height of the upper plate member 5.

In introducing a fruit 3 between the plate members 5 it is important that the fruit has its longitudinal axis properly aligned relative to the plates 5. For this purpose, as shown particularly in FIG. 3b and FIG. 2, a loading arrangement 14 is shown comprising an outer casing 15 mounted within which are a plurality of brush assemblies 16 defining a substantially central aperture 17. The loading assembly 14 as shown particularly in FIG. 3b, is able to pivot about its mounting on a shaft 18 to provide access to the central aperture 17 for a fruit 3. Once inserted, the brushes 16 act so as to centralise the fruit 3 in a correct vertical disposition at which time the assembly 14 can be swung into position between the plates 5, as shown in FIG. 3b, and the top plate 5 lowered so as to engage the fruit 3 between the plates 5. So as to not interfere with the subsequent operation of the apparatus 1 the loading assembly 14 is shown in outline in FIG. 3b and in full lines in FIG. 1 as 14', raised from its loading position so as to be above the top plate 5. To achieve this, the shaft 18 is shown provided at its upper end with a cam follower 19 which is engageable within a cam profile 20 provided for support structure 9. The cam profile 20 is such that after the loading station, the loading assembly 14 will be raised into its upward position until it approaches the loading station again to receive its next fruit. The bristle assembly 16 can be of any suitable type but may preferably comprise one or more blocks of bristles which can be screwed or otherwise secured in position on the interior surfaces of the outer casing 15.

As will be particularly apparent from FIG. 2, the fruit 3 once loaded will, in this embodiment, be carried in the direction indicated by arrows X in a circular path while the skin is removed. Once the peeled fruit has been discharged in the direction indicated by arrow P, the now empty fruit carrier returns to be reloaded as indicated by arrow R. The movement of the carrier members 2 can be controlled by any suitable means but suitably a stepping motor or the like 21 may control the positioning of the arms 22 so that a required residence or dwell time can be achieved at each of the required stations around the circular path.

Referring particularly to FIG. 2, the fruit 3 will first be transported to a heating station 23, then to a ripping or scragging station 24, a vacuum peel removing station 25 and finally, in this embodiment, a cutting station 26, the peeled and cut fruit leaving the apparatus 1 in the direction P along a discharge chute 27.

The fruit 3 is therefore caused to travel along the path of the apparatus 1 while at the same time it is being rotated. The speed of travel and speed of rotation can be readily adjustable so that the dwell time of the fruit 3 at any processing stage can be controlled as well as the speed of rotation of the fruit 3 during that dwell time. At the heating station 23 the fruit 3 is heated sufficiently that a separation or at least a partial separation is caused between the skin and the underlying flesh of the fruit 3. By way of explanation, beneath the skin of a fruit or vegetable is a water pectin layer separating it from the flesh proper and the heating is intended to provide a vaporisation of this water pectin layer which will be indicated by a bubbling of the skin showing that the skin is lifting off from the underlying flesh. In the case of kiwifruit of an appropriate ripeness, determined by Brix (suitably 12–14 percent ss), and a penotrometer reading (suitably 0.8–1.2 kg), the temperature could perhaps be 800° C.–1200° C. and with a possible dwell time at the heating station 23 of perhaps 4 to 14 seconds and typically perhaps 6 to 10 seconds. The dwell time will however depend on the characteristics of the fruit or vegetable, the temperature being used, the heating source and/or the speed of rotation of the fruit or vegetable as well as other factors such as its initial temperature for example.

Figure 4:
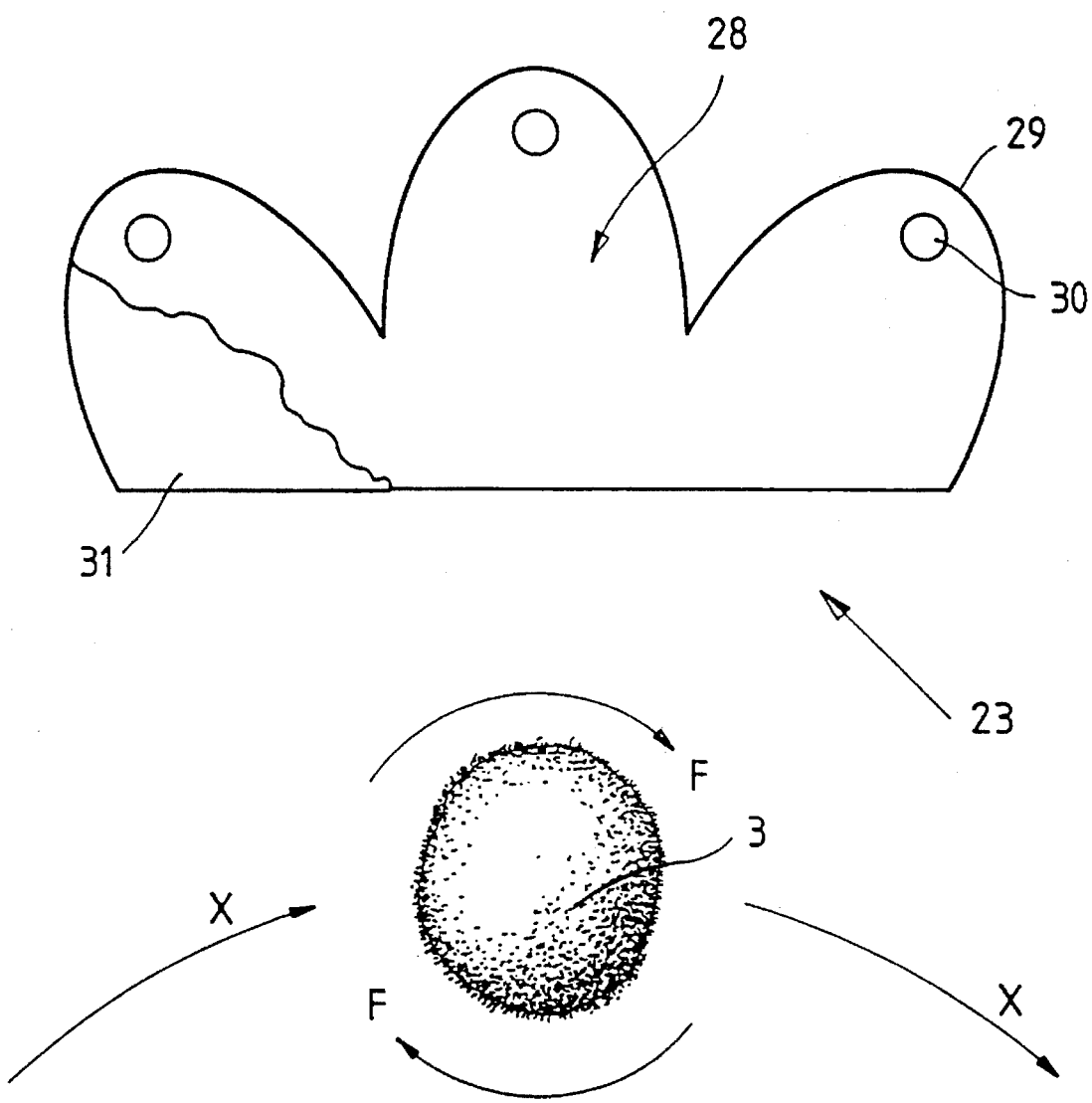
FIG. 4: shows very diagrammatically a plan view of a heating station of the apparatus of FIGS. 1 and 2.

The heat source used at the heating station 23 may be of any suitable type and may for example be a gas or liquid fuel flame, as described hereinafter with respect to a further embodiment, an electrical heating element or as illustrated diagrammatically in FIGS. 2 and 4, an infra-red source 28. The heat source 28 is shown diagrammatically as comprising a series of ellipsoidal reflectors 29 positioned within which are respective quartz/tungsten filament lamps 30, the reflectors 29 focusing the infra-red radiation onto the fruit 3 as it rotates in a direction indicated by arrows F during its dwell time at the station 23. One or more reflectors 29 may be utilised as could top and bottom heat shields 31. Typically the reflectors 29 will comprise gold anodised aluminium extrusions. The use of infra-red radiation as heating can be particularly beneficial in that the heating effect can penetrate below the skin to only a depth of only a few millimeters so that the interior of the fruit 3 is not affected. Also, as infra-red radiation is purely thermal energy it does not have any disadvantages such as other forms of heating may have.

Figure 5:
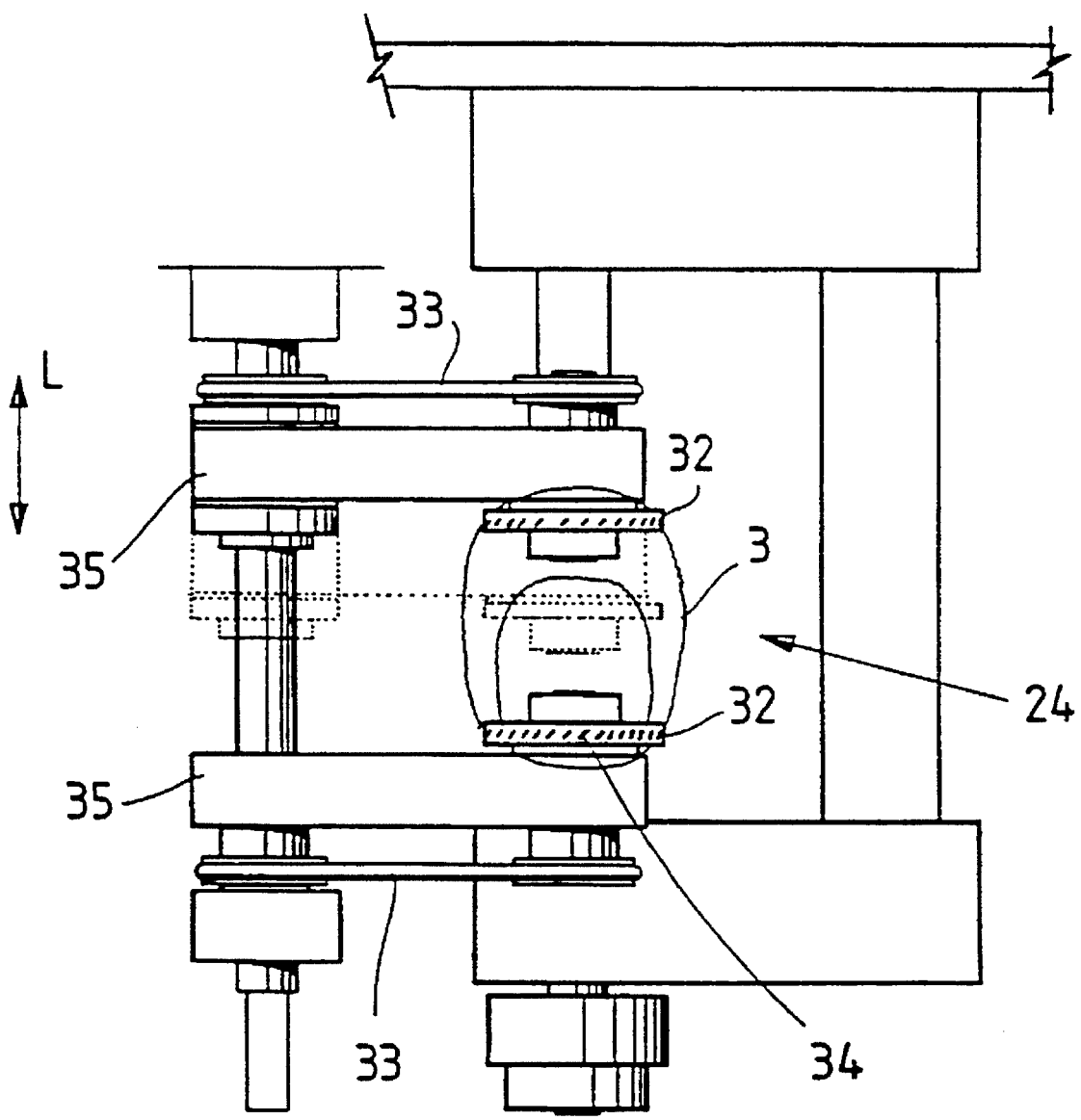
FIG. 5: shows very diagrammatically a side view of a ripping station of the apparatus of FIGS. 1 and 2.

The fruit 3 will then travel to the ripping or scragging station 24 which is shown very diagrammatically in FIG. 5 as including a pair of spaced apart ripping or scragging wheels or discs 32 which are driven in this example by respective drive belts 33. The direction of rotation of the wheels or discs 32 will preferably be in the same direction as the direction of rotation of the fruit 3 so that in the example shown, with the fruit being rotated in a clockwise direction, similarly, the wheels or discs 32 will be driven in a clockwise direction. In this way as the spokes or projections 34 provided around the periphery of the wheels or discs 32 engage with the skin of the fruit 3, the skin will be picked up and lifted from the underlying flesh.

The discs 32 are shown mounted on a pair of arms 35 able to be pivoted as indicated by the arrow T so as to engage with the fruit 3 and suitably a control, such as a spring, may be provided on that pivoting action so as to control the force with which the discs 32 engage with the fruit 3. Limiting means may be provided so as to ensure that a particular depth of penetration of the projections 32 in the fruit 3 is not exceeded. For a fruit such as kiwifruit, a pair of discs 32 are shown provided so as to lift the fruit skin adjacent both its ends. For alternative fruit or vegetables a single disc 32 may be all that is necessary. Also, for some fruit or vegetables only a minimal lifting of the skin may be appropriate. In FIG. 5, the arms 35 are shown able to be raised and lowered as indicated by the arrows L so that different sizes of fruit 3, shown in outline, can be accommodated.

While a pair of spiked wheels or discs 32 have been shown by way of example, it is to be appreciated that any other type of device could be used for the purpose of lifting off a required portion of skin from the fruit 3.

Figure 7:
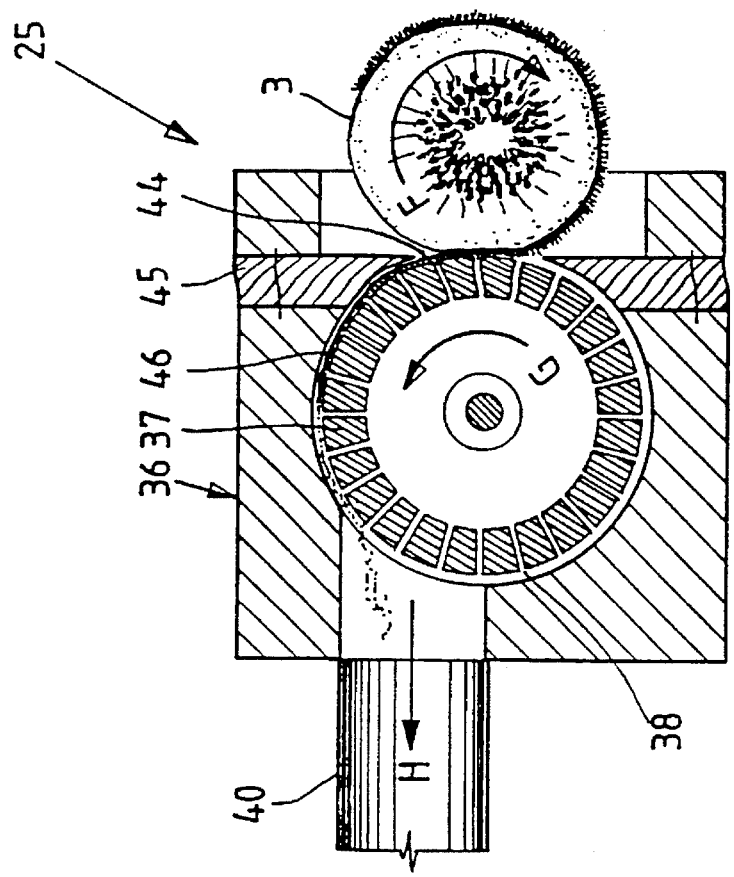
FIGS. 6 and 7: show side and end views of a vacuum skin removing station of FIGS. 1 and 2.
Figure 6:
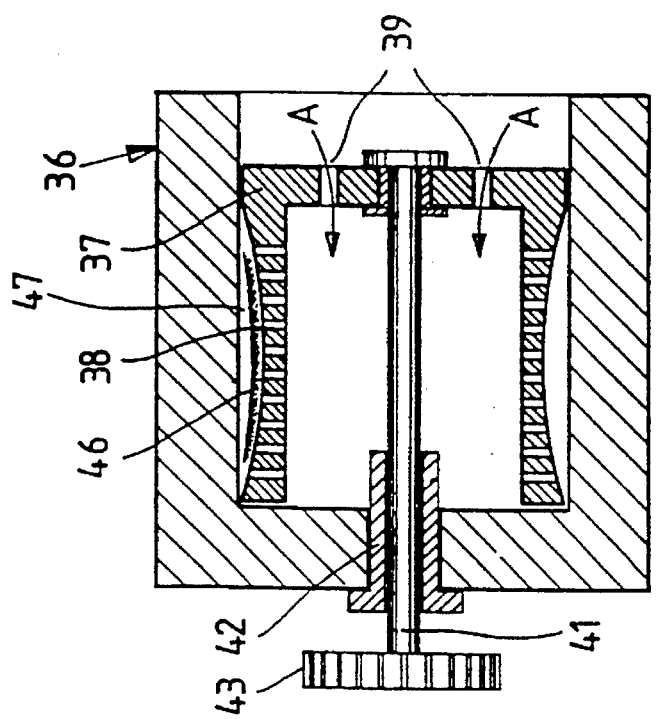

As shown particularly in FIG. 2, the fruit 3 will then travel to a skin lifting vacuum station 25. At the station 25 in this particular embodiment of the invention a vacuum head 36 in FIGS. 6, 7 is shown very diagrammatically as having a rotatable drum 37 with a plurality of slots or holes 38 about its circumference and end slots or holes 39 providing a passage for airflow in the direction of arrows A caused by the application of vacuum on an outlet 40. The drum 37 is shown driven by a shaft 41 mounted through bearing 42 to sprocket 43. The drum 37 is exposed through an aperture 44 defined by a spacer member 45 and allowing the drum 37 to engage with the fruit 3 rotating in the direction indicated by arrow F, the drum 37 rotating in the direction indicated by arrow G. The vacuum applied to the skin of the fruit 3 through the slots or holes 38 tends to hold the skin against the surface of the drum 37 as it rotates causing the skin 46 to be lifted off and to be carried with the drum 37 up to the outlet 40 as indicated by the arrow H. The lifting of the skin achieved at the scragging station 24 is believed to facilitate the vacuum lifting the skin 46 from the flesh of the fruit 3. The curved shape of the drum 37, as shown particularly in FIG. 6, defines a space 47 with the outer housing within which the skin 46 can be caused to travel as it is taken off.

Figure 8:
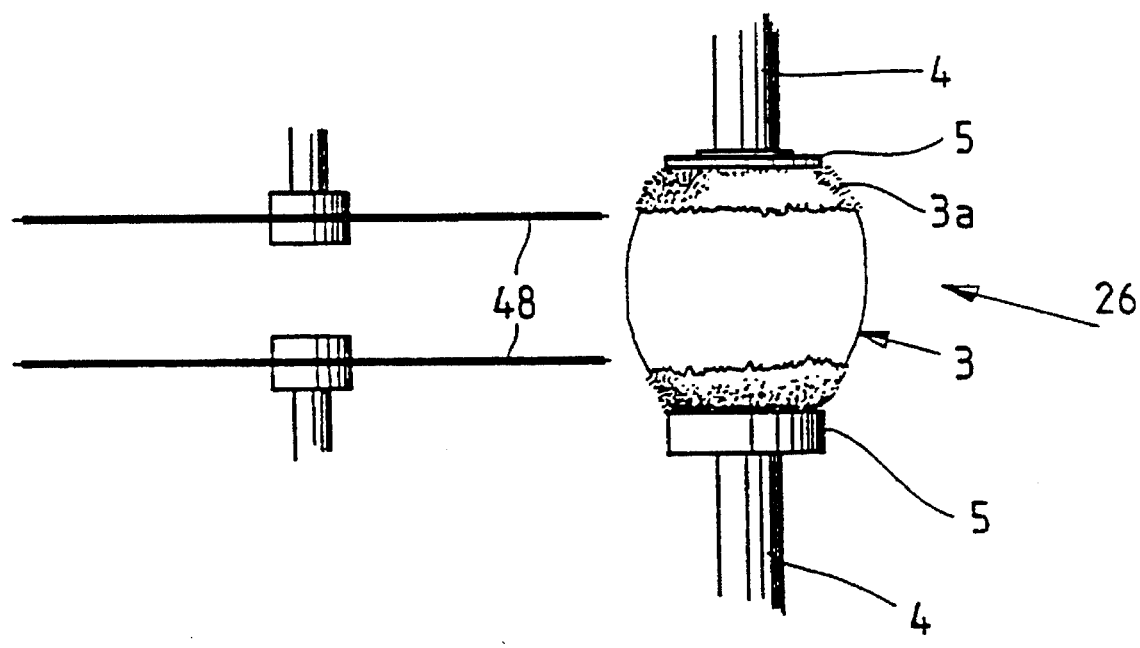
FIG. 8: shows very diagrammatically a topping and tailing station of the apparatus of FIGS. 1 and 2.

The fruit 3 with its central core peeled at the vacuum station 25 will now in this embodiment of the invention, travel to a cutting station 26. Referring to FIG. 8, a fruit 3 is shown in position at the cutting station 26 with its flesh exposed after the central skin has been removed. The fruit 3 is shown as still being held effectively and efficiently by the toothed plates 5 at the end of the rotating shafts 4. The fruit 3 is shown being presented to a pair of rotating blades 48 which will be able to top and tail the fruit 3 so that the central peeled core or plug can be separated from the still skin covered ends 3a. It is to be appreciated however that in alternative embodiments the entire skin may be removed at the vacuum station 25 so that a topping and tailing operation may not then be required. In that case the cam profile 10 (refer to FIG. 1) can then be used to provide the lifting of the one or both plates 5 to enable the release of the fully peeled fruit 3. Once the fruit 3 has been released into the discharge outlet 27, the now empty carrier member will move in a direction indicated by arrow R (see FIG. 2) to receive a new fruit.

While, in this embodiment, cam profiles 10, 20 have been utilised in order to control the movement of the plates 5 and the loading assembly 14, it is to be appreciated that any other type of control arrangement could be used such as an hydraulic or pneumatic control system for example.

In an alternative embodiment of the present invention as shown in FIGS. 9 to 13 a linear rather than a rotary arrangement may be utilised. The linear arrangement may have an input assembly such as shown very diagrammatically in FIG. 9. Here, a conveyor 103 is shown consisting of an endless chain engaging a plurality of sprockets 113 which are caused to rotate in a direction indicated by arrow S which will rotate the shafts shown in outline 105 thereby rotating the fruit 101. As will be clear from reference to FIGS. 9 and 10, the loading of the fruit 101 onto the carriage members 104 of the conveyor 103 is complicated by the longitudinal axis of the feed conveyor 117 with its carriage members 118 being offset laterally from the longitudinal axis of the conveyor 103. Such offsetting is necessary in that otherwise the carriage members 104 would be interfering with the fruit 101 as it moved between the respective conveyors.

In this particular embodiment, a vacuum means 119 is shown positionable (shown in outline) over the fruit 101 on a carriage member 118 of the conveyor 117. At that time vacuum can be applied to the vacuum pipe or the like 119, enabling the upward movement of the vacuum pipe 119, as indicated by arrows "T" in FIG. 9 to lift the fruit 101 from the carriage 118. A lateral control member 120, shown in the form of a laterally moveable pusher member 121 is illustrated diagrammatically in FIG. 10 as controlling the lateral movement of the vacuum pipe 119. Typically, the vacuum pipe 119 may be biased into its position shown in full lines in FIG. 10, but may be pushed to its position shown in outline disposed over the fruit 101 on the carriage members 118. Alternative biasing arrangements may of course be provided as may be appropriate.

Figure 10:
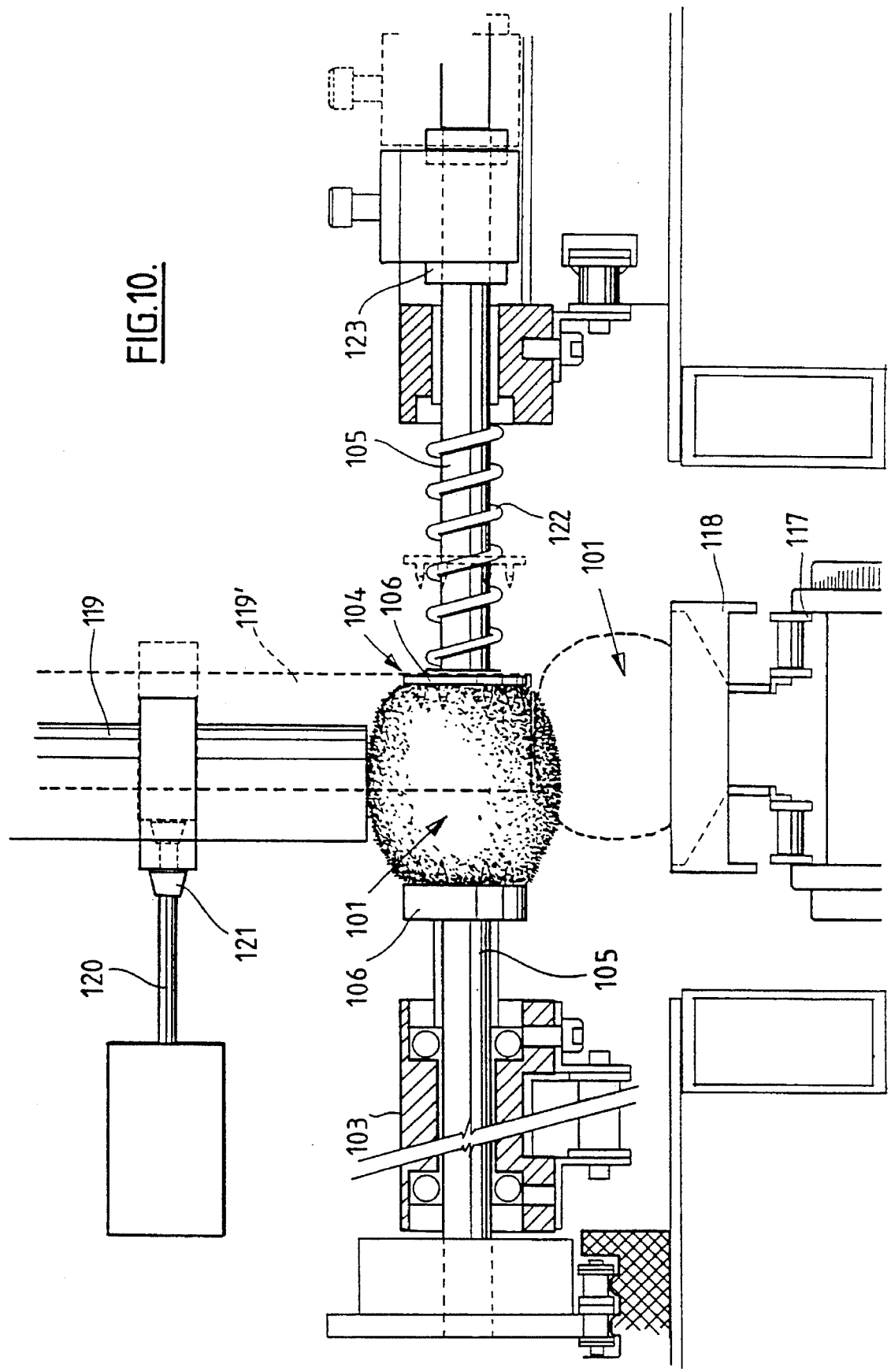

The upward and lateral movement of the vacuum pipe 119 with the fruit 101 held by the applied vacuum will be synchronised with the lateral movement indicated by the full and outline positions of the toothed gripping member 106 in FIG. 10 on its spindle 105 and bias by a spring or the like 122 in the example shown. Suitably a cam member (not shown) on the right hand side of the arrangement shown in FIG. 10 will be engaging with the member 123 provided on the spindle 105, holding the spindle 105 in its retracted position. The termination of the cam will then coincide with the position at which the spindle 105 is required to move inwardly to the full line position in FIG. 10 to engage with the fruit 101 and to push it into full engagement with the toothed member 106 on the spindle 105 on the opposite side. The spindle 105 will then hold and rotate the fruit 101 in the position shown in FIG. 10 until the peeled fruit is ready to be released. At that time a suitable cam may once again engage with the member 123 in providing for a lateral withdrawal of the spindle 105 against the bias of the spring 122.

Referring now to FIG. 11, the various stations along which the fruit will travel as it is peeled are identified as, the heating station "a", the ripping or scragging station "b" and the peeling station "c".

The fruit 101 is carried by a conveyor 103 having a plurality of carrier members 104. Typically this may be a multi-lane conveyor in a larger installation or for a small operation could be simplified into the form of a single lane or wheel with only a few carrier members 104. After loading onto the conveyor 103 by loading apparatus such as described with reference to FIGS. 9 and 10, the fruit 101 passes to the heating station "a". As shown in FIG. 11a, very diagrammatically, this heating means 107 may consist of plurality of flames 108, suitably a plurality of gas or liquid fuel jets, which can heat up the fruit 101 as it is rotated and travels over the flames 108 in the direction of arrow "X". The rotation of the fruit 101 and its carriage is shown provided by a toothed gripping member 106 at the end of a rotating spindle 105 indicated as rotating in the direct of arrow Y, a corresponding gripping member 106 and spindle 105 being suitably provided on the opposite end of the fruit 101. The temperature of the flames 108 or other heating means, the total time of passage of the fruit 101 over the heating means 107 and/or the speed of rotation of the fruit 101 will all be controlled to provide a separation or at least a partial separation of the skin and the underlying flesh. These parameters will require adjustment depending on the type of fruit or vegetable and also the ripeness of the fruit or vegetable itself.

Figure 12A:
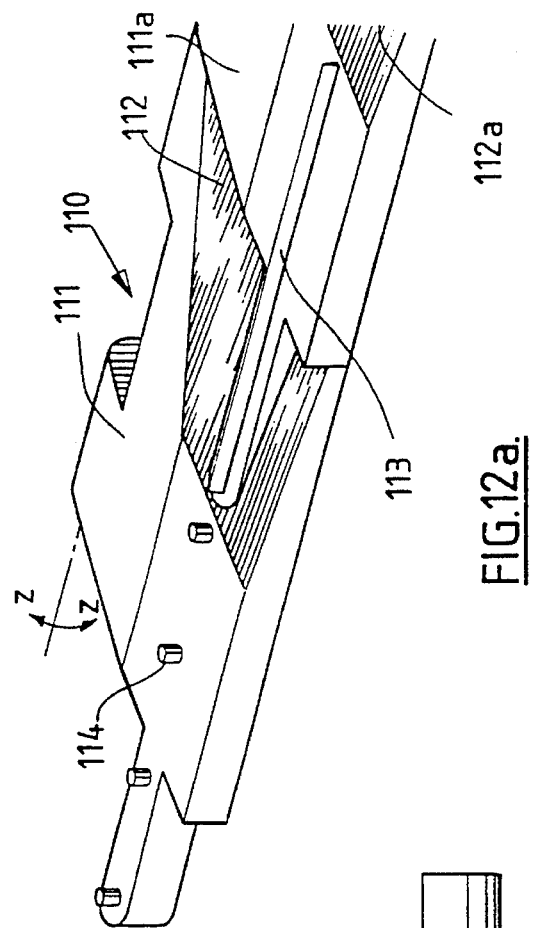
FIGS. 12 and 12a: show a very diagrammatically end and side views of a ripping station for use in the further possible embodiment of the invention.
Figure 12:
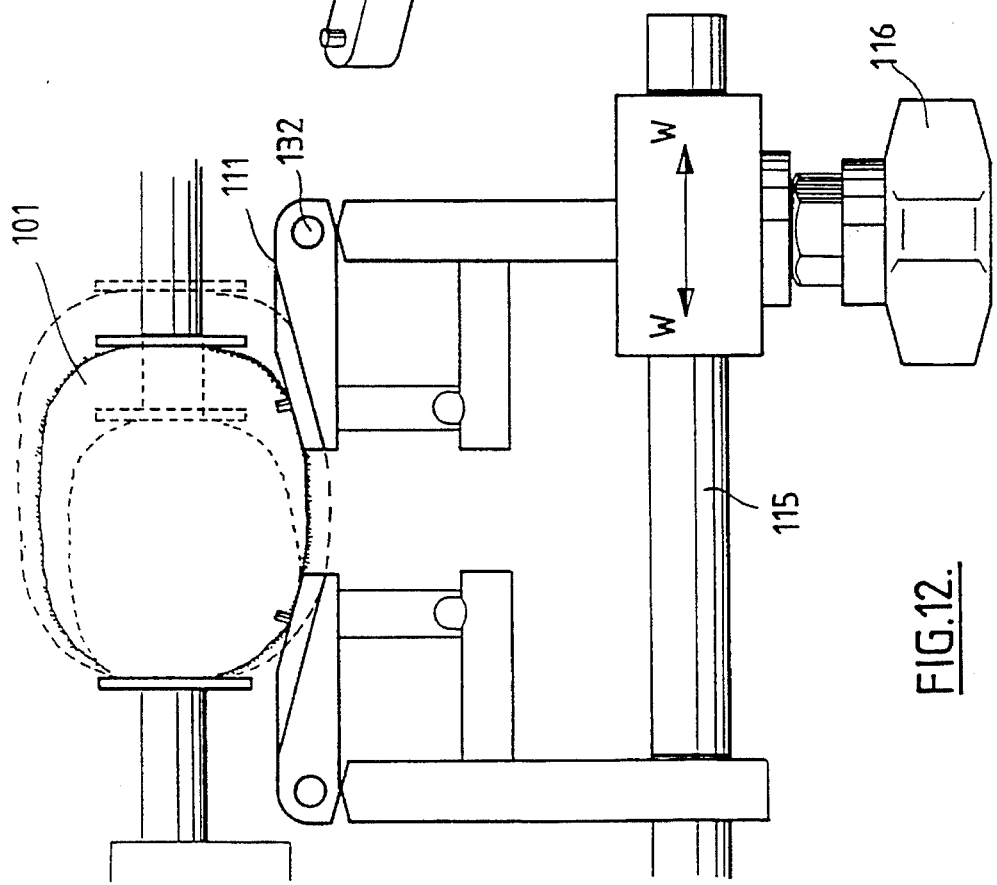

In station "b" the fruit is then shown passing over the ripping or scragging means, referenced generally by arrow 110 and shown in greater detail in FIGS. 12 and 12a. As illustrated, the ripping or scragging means 110 comprises a support member 111 in the form of a laterally disposed plate pivotable about a horizontal pivot member 132 so as to be moveable in a vertical plane in response to the weight of the fruit 101. At the station "b" a plurality of these plate members 111 may be positioned along the path of the fruit although in FIG. 12a only a pair of plate members 111 are shown. The plate members are suitably provided with a forwardly facing ramp 112 to facilitate the fruit being carried onto the ripping/tearing apparatus. In FIG. 12a, the initial plate member 111a is shown provided with a blade or the like 113 which is adapted to provide a peripheral cut about the peripheries of the fruit 101. The blade 113 is shown aligned with a plurality of upstanding ripping members 114 shown in the form of upstanding pegs or pins or the like. As the fruit 101 rotates and travels over the ripping station 110 a cut will first be provided in the skin following which the pins or projections 114 will rip or tear the skin about the cut providing at least a partial lifting of the skin from the flesh. The ability of the plate members 111 to pivot in a direction indicated by arrows "Z" in FIG. 12a, allows an accommodation of various weights and sizes of fruit 101. Also as shown in FIG. 12, the plate members 111, at least on one of the sides of the station "b", may preferably be adjustably mounted on a support member 115 so as to be moveable in the direction indicated by arrows "W" and be able to accommodate more readily a variable length of fruit 101 as indicated diagrammatically in outline in FIG. 12. A locking member 116 may be provided to enable this lateral adjustment to be made. It is envisaged that an automatic adjustment may be provided whereby the length of fruit is detected at or prior to the station "b" so that the appropriate adjustment is then made as or before the fruit 101 arrives. At station "c" with the fruit 101 still travelling in the direction "X" and being rotated on spindles 105, a vacuum is applied which will lift the skin 142 and peel it from the flesh. The previous ripping of the skin 142 at station "b" will facilitate the vacuum being able to access beneath the skin 142. The vacuum may be applied by the method and apparatus of the type shown in FIGS. 6 and 7.

Figure 13:
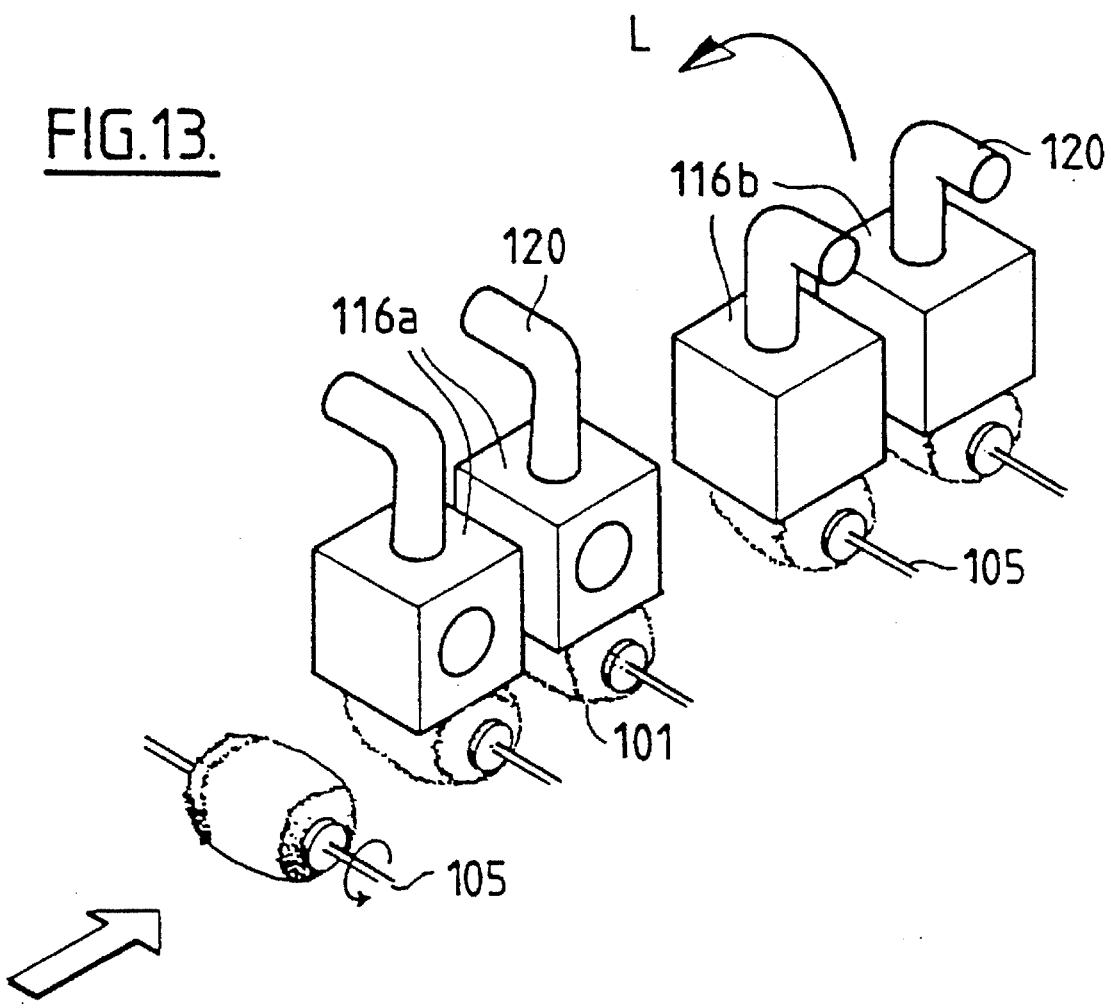
Figure 13:
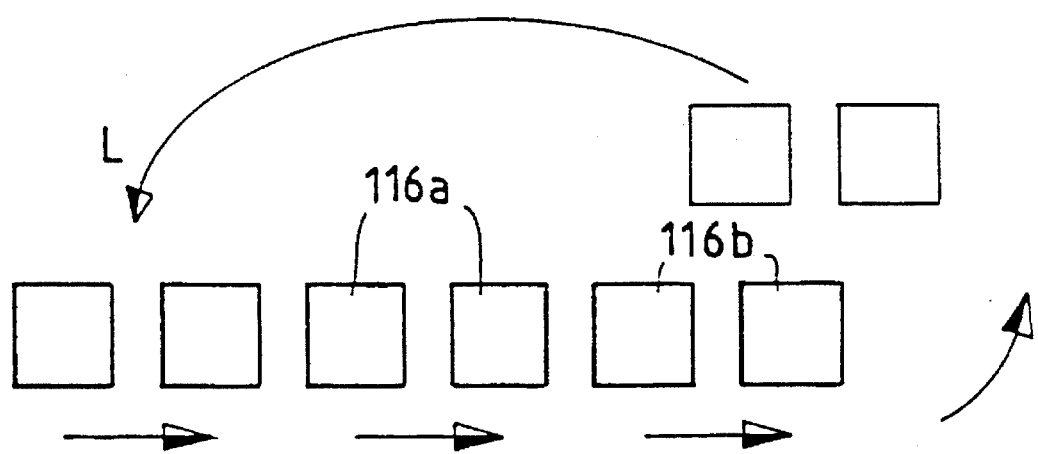

In such a linear arrangement however it may be useful to enable a plurality of fruit to be vacuum peeled simultaneously. Referring therefore to FIGS. 13 and 13a, in one arrangement, the vacuum heads 116 are provided in pairs with the first pair 116a being moveable into position over a pair of fruit 101 at the commencement of a skin removing operation at the same time as a forward pair of vacuum heads 116b have just finished the removal of skin from a preceding pair of fruit 101 and are being lifted up to be moved into position so as to cover a succeeding pair of fruit 101. This is illustrated very diagrammatically in FIG. 13a showing how the vacuum heads 116a and 116b alternate as being the leading and following pair as they move to vacuum off the skin from respective pairs of fruit 101.

While a particular form of vacuum head is shown in FIGS. 6 and 7, other vacuum systems which could be used may not have a rotating drum to assist in the removal of the skin and the type of vacuum system which may be used my depend on the type of fruit or vegetable to which the vacuum is being applied.

Where in the foregoing description, reference has been made to specific components or integers of the invention having known equivalents, then such equivalents are herein incorporated as if individually set forth.

Although this invention has been described by way of example and with reference to possible embodiments thereof, it is to be understood that modifications or improvements may be made thereto without departing from the scope or spirit of the invention as defined in the appended claims.

We claim:

1. A method of peeling a fruit or vegetable comprising the steps of:
   (i) heating the fruit or vegetable to at least partially separate the skin from the flesh;
   (ii) ripping the skin about at least one peripheral portion thereof so that at least a partial lifting of the skin at or about the rip occurs; and
   (iii) applying a vacuum to said skin at or about said rip to lift said skin from said flesh.

2. A method is claimed in claim 1 including the step of rotating said fruit or vegetable during the heating, ripping and vacuuming steps.

3. A method is claimed in claim 2 wherein said ripping step includes rotating a ripping means having projecting means which can extend into the skin and wherein the direction of rotation of said ripping means is the same as that of the fruit or vegetable.

4. A method is claimed in claim 3 wherein said vacuuming step includes rotating a vacuum means to engage with said skin and wherein said direction of rotation of said vacuum is counter to the direction of rotation of said fruit or vegetable.

5. A method is claimed claim 1 wherein said skin is removed about a substantially central portion of said fruit or vegetable and including the further step of cutting said fruit or vegetable about said substantially central portion.

6. An apparatus for peeling a fruit or vegetable comprising:
   (i) a heating means to heat a fruit or vegetable sufficient to at least partially separate the skin from the flesh;
   (ii) a ripping means to rip said skin at least about one peripheral portion of the skin so that the skin is at least partially lifted from the fruit or vegetable; and
   (iii) a vacuum means to act on said fruit or vegetable at or about said rip so as to lift said skin from said fruit or vegetable.

7. An apparatus as claimed in claim 6 wherein said fruit or vegetable is carried in a carriage means, a centralising means being provided so as to correctly position said fruit or vegetable within said carriage means, said centralising means comprising a plurality of brushes defining an aperture within which said fruit or vegetable can be received and centralised.

8. An apparatus as claimed in claim 7 wherein said centralising means can be moved from a loading position adjacent to said carriage means following said centralising of said fruit or vegetable.

9. An apparatus as claimed in any one of claim 6 wherein said ripping means comprises at least one wheel or disc having a plurality of projections thereon adapted to engage with said skin.

10. An apparatus as claimed in any one of claim 6 wherein said vacuum means comprises a rotatable slotted or apertured drum having a peripheral recess adapted to receive therein said skin from said fruit or vegetable, said drum including a plurality of peripheral slots or holes to provide access of said vacuum to said skin as it is contacted by said rotating drum, the direction of rotation of said drum being counter to that of said fruit or vegetable.

11. An apparatus as claimed in any one of claim 6 wherein a plurality of said vacuum means are provided, at least two sets of said vacuum means being adapted to sequentially move into and out of engagement with respective sets of fruit or vegetable to peel the skin therefrom.

12. An apparatus as claimed in any one of claim 6 wherein said carriage means are provided on a first conveying means having a longitudinal axis off-set from the longitudinal axis of a feed-in conveying means and wherein a movable vacuum transfer means is adapted to transfer said fruit or vegetables from said feed-in conveying means to said first conveying means.

* * * * *